(12) United States Patent
Evans

(10) Patent No.: US 8,393,443 B2
(45) Date of Patent: Mar. 12, 2013

(54) VEHICLE DRIVE SYSTEM

(75) Inventor: Paul Evans, Hornsby (AU)

(73) Assignee: Evans Electric Pty Limited, Hornsby (AU)

( * ) Notice: Subject to any disclaimer, the term of this patent is extended or adjusted under 35 U.S.C. 154(b) by 1281 days.

(21) Appl. No.: 12/093,084

(22) PCT Filed: Nov. 9, 2006

(86) PCT No.: PCT/AU2006/001665
§ 371 (c)(1),
(2), (4) Date: May 8, 2008

(87) PCT Pub. No.: WO2007/053889
PCT Pub. Date: May 18, 2007

(65) Prior Publication Data
US 2008/0283348 A1 Nov. 20, 2008

(30) Foreign Application Priority Data
Nov. 9, 2005 (AU) ................................. 2005906181

(51) Int. Cl.
*B60L 7/00* (2006.01)
(52) U.S. Cl. ....... 188/164; 188/158; 180/65.6; 180/65.1
(58) Field of Classification Search .................. 188/164, 188/158; 180/65.6, 65.1
See application file for complete search history.

(56) References Cited

U.S. PATENT DOCUMENTS

| | | | | |
|---|---|---|---|---|
| 3,837,442 A | * | 9/1974 | Baermann | 188/159 |
| 4,223,255 A | * | 9/1980 | Goldman et al. | 318/400.41 |
| 4,475,075 A | * | 10/1984 | Munn | 322/1 |
| 4,585,085 A | * | 4/1986 | Handel et al. | 180/65.25 |
| 5,333,706 A | * | 8/1994 | Mori | 188/156 |
| 6,039,157 A | * | 3/2000 | Yamada et al. | 188/158 |
| 6,702,404 B2 | * | 3/2004 | Anwar et al. | 303/152 |
| 6,904,987 B2 | | 6/2005 | Haas et al. | |
| 2002/0166737 A1 | * | 11/2002 | Chen | 188/74 |
| 2003/0189380 A1 | * | 10/2003 | Ishikawa et al. | 310/77 |
| 2005/0110353 A1 | | 5/2005 | Kramer | |
| 2005/0217950 A1 | * | 10/2005 | Jolley et al. | 188/218 R |
| 2008/0179146 A1 | * | 7/2008 | Sullivan | 188/164 |

FOREIGN PATENT DOCUMENTS
CA 1196289 A 11/1985
DE 19917297 A1 10/2000

* cited by examiner

*Primary Examiner* — Robert A Siconolfi
*Assistant Examiner* — James Hsiao
(74) *Attorney, Agent, or Firm* — Stetina Brunda Garred & Brucker; Lowell Anderson

(57) ABSTRACT

An electric drive system for a vehicle; said drive system including an electric motor at at least one wheel of said vehicle; said electric motor comprising an electric field source adapted to induce rotational torque in the brake disc associated with said wheel of said vehicle. In an alternative form there is provided a method of imparting a torque to a wheel of a vehicle; said wheel having a brake disc rotor mechanically associated with it; said method comprising utilizing said rotor as a motor rotor whereby said rotor performs a dual function of a disc brake and a motor rotor.

18 Claims, 4 Drawing Sheets

VEHICLE DRIVE SYSTEM

CROSS-REFERENCE TO RELATED APPLICATIONS

The present application claims priority to International Application No. PCT/AU2006/001665 which was filed on Nov. 9, 2006 and claims priority to Australian Patent Application No. AU2005906181 filed Nov. 9, 2005.

BACKGROUND

The search for alternatives to a transport system largely dependent on the internal combustion engine has seen a renewed interest in electric and hybrid vehicles. Many configurations of electric motors applied for vehicle use are known but frequently require purpose built drive trains between the one or more motors and the driven wheels.

Another disadvantage of know systems is that an integrated system incorporating the modern safety and convenience aspects of vehicle control, such as anti-lock braking, traction control cruise control is usually not provided for.

It is an object of the present invention to address or ameliorate some of the above disadvantages.
Notes The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

BRIEF SUMMARY

Accordingly in one broad form of the invention there is provided an electric drive system for a vehicle; said drive system including an electric motor at at least one wheel of said vehicle; said electric motor comprising an electric field source adapted to induce rotational torque in the brake disc associated with said wheel of said vehicle.

Preferably said motor includes an electric field source in the form of pairs of electromagnetic coils, wherein corresponding ones of each of said pairs of coils are disposed on opposite sides of said brake disc of said wheel.

Preferably said electromagnetic coils are provided with variable frequency alternating current; said alternating current provided via an inverter from a battery power source.

Accordingly in a further broad form of the invention there is provided an electric drive system for a vehicle; said drive system including an electric motor at each wheel of said vehicle; each said electric motor adapted to provide rotational torque to the brake disc of each wheel said vehicle.

Preferably each said motor comprises pairs of electromagnetic coils, wherein corresponding ones of each of said pairs of coils are disposed on opposite sides of a brake disc of said wheel.

Preferably said electromagnetic coils are provided with variable frequency 3-phase alternating current; said alternating current provided via an inverter from a battery power source.

Preferably each electric motor is individually supplied with said variable frequency 3-phase alternating current by a microprocessor controlled inverter.

Preferably said brake disc is a standard brake disc of a disc brake system; said brake disc mounted at the hub of each wheel of said vehicle.

Preferably said brake disc comprises a toroidal laminated core with copper or aluminium ladder bars contained radially within to form a squirrel cage.

Preferably said pairs of coils are connected in series or in parallel; said coils supplied with said 3-phase alternating current on the same phase.

Preferably said pairs of coils comprise three pairs of coils; said coils disposed within an arc of said brake disc.

Preferably said motor is adapted to replace a standard hydraulic disc brake calliper.

Preferably said motor is of similar bulk as that of said hydraulic disc brake calliper; said motor adapted for mounting to mounting points of said hydraulic brake disc calliper.

Preferably rotational velocity and direction of each said wheel is a function of said variable frequency and phases of said 3-phase alternating current.

Preferably direction of rotation torque of a said motor urges said vehicle in a first forward direction when two phases of said 3-phase alternating current are arranged in a first phase configuration.

Preferably said direction of rotation torque of a said motor is reversed when said two phases of said 3-phase alternating current are arranged in a second phase configuration.

Preferably braking of said vehicle is induced when said variable frequency is less than a frequency commensurate with a said rotational velocity.

Preferably said braking is regenerative adapted to recharging said battery power source.

Preferably a first variable braking force is applied to a said brake disc while said rotational direction is commensurate with said phases but said variable frequency is between that commensurate with said rotational velocity of said wheel and 0 Hz.

Preferably a second variable braking force is applied to said brake disc when said rotational direction is opposite to that indicated by said arranging of two phases and said variable frequency is greater than 0 Hz.

Preferably said first variable braking force and said second variable braking force are controlled through a potentiometer connected to a brake pedal of said vehicle.

Preferably said rotational velocity of each of wheel is monitored by sensors.

Preferably each said microprocessors is adapted to apply anti-lock breaking characteristics to said second variable breaking force when said sensors record disparate rotational velocities.

Preferably steering angle of said vehicle is monitored by a sensor.

Preferably each said microprocessor is adapted to apply varying rotational torques to wheels on opposite sides of said vehicle as a function of inputs from sensors monitoring rotational velocities of each wheel and said steering angle.

In a further broad form of the invention there is provided a method of imparting a torque to a wheel of a vehicle; said wheel having a brake disc rotor mechanically associated with it; said method comprising utilising said rotor as a motor rotor whereby said rotor performs a dual function of a disc brake and a motor rotor.

In a further broad form of the invention there is provided a method of providing rotational torque to the brake discs of a vehicle by the application of variable frequency 3-phase alternating current to said brake discs.

Preferably said variable 3-phase alternating current is provided to coils mounted at each of said brake discs.

Preferably said variable 3-phase alternating current is provided from a battery power source via a microprocessor controlled IGBT inverter.

Preferably said electric motors are adapted to provide regenerative braking; said regenerative braking adapted to provide a charge to said battery power source.

Preferably said method includes the steps of:
(a) monitoring rotational velocities of each of said wheels,
(b) varying rotational torque inputs to brake discs as a function of said rotational velocities.

BRIEF DESCRIPTION OF THE DRAWINGS

Embodiments of the present invention will now be described with reference to the accompanying drawings wherein.

DETAILED DESCRIPTION

First Preferred Embodiment

In preferred forms, the invention provides for an in-wheel electric motor that can provide independent electric direct drive and brake to each wheel of a vehicle. This motor allows a single system to provide four wheel drive, traction control, regenerative braking, eddy current braking, anti-lock braking, vehicle stability control and electronic brake force distribution (brake bias). This system can also incorporate intelligent cruise control and collision avoidance.

Figure 1:
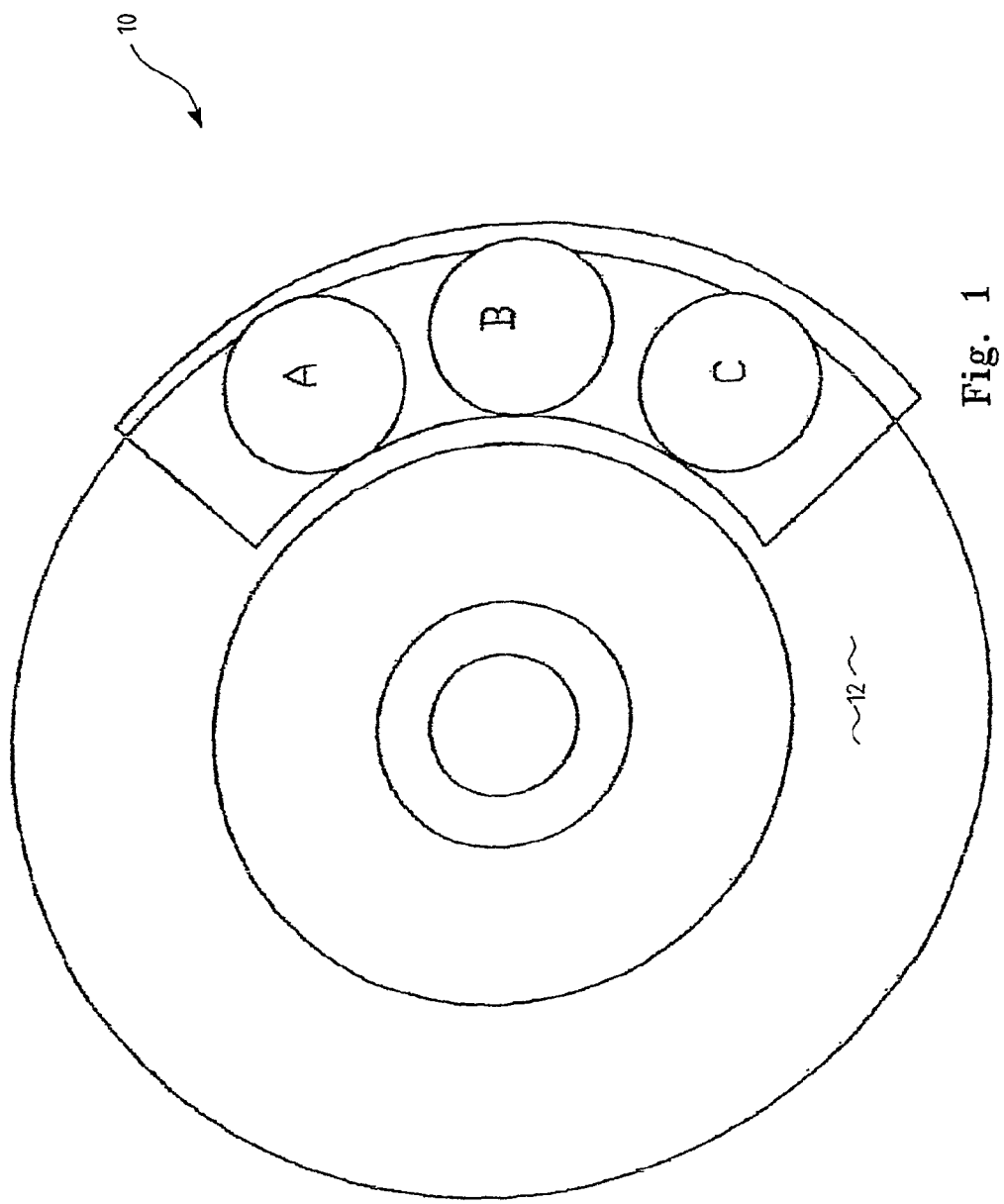
FIG. 1 is a schematic side view of an electric motor drive and brake unit according to a preferred embodiment of the invention.
Figure 2:
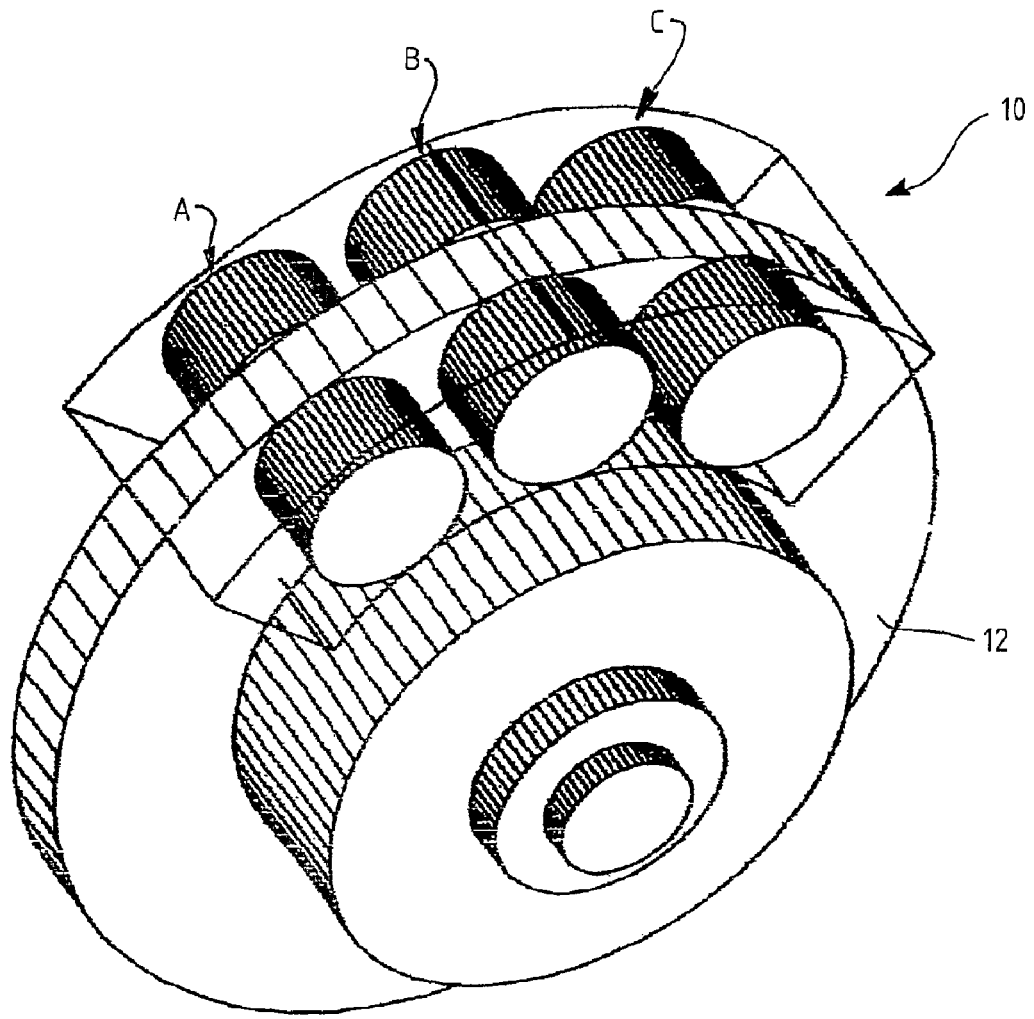
FIG. 2 is schematic perspective view of the motor drive and brake unit of FIG. 1.
Figure 3:
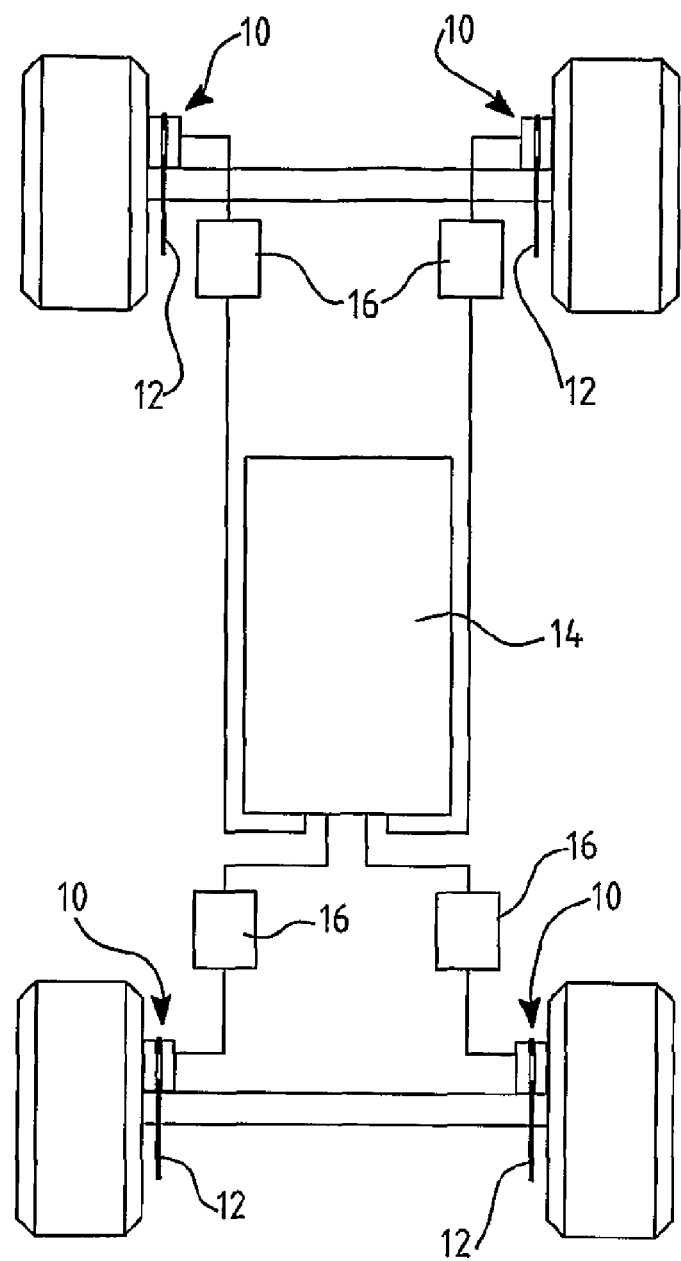
FIG. 3 is a schematic view of the major components of the drive system applied to a vehicle

The in-wheel motor is based on linear induction motor principles. In this case 3-phase alternating current is induced into a disc to produce rotary motion. With reference to FIGS. 1 to 3, The disc or rotor 12 in this preferred embodiment of the motor 10 of a vehicle drive system, can be a standard motor vehicle brake disc mounted in the standard position surrounding each wheel's hub within each wheel of the vehicle (not shown). Pluralities of coils A, B and C are mounted facing each side of the brake disc separated by an air gap. Three phase AC induction motor principles are well known where copper wire wound around the outside circumference of an electric motor have a 3 phase moving AC electric current applies to them inducing an eddy current within the motors rotor that converts electrical energy into rotary torque.

For this in-wheel electric motor 10 according to preferred embodiments of the invention, as few as 3 pairs of electromagnetic coils A, B and C can be used to induce a three phase eddy current in the brake disc 12 to convert electrical energy into rotary torque. Preferably, 3 coils are mounted on each side of the disc facing each other separated by the disc. In the six coil arrangement of FIGS. 1 and 2, pairs of coils directly facing each other are typically connected in series or parallel on the same phase. Because a relatively small number of coils can be used and the motor therefore does not have a large number of coils mounted around the 360 degrees circumference of the disc, the motor 10 can be compact and comparable in size to a hydraulic brake calliper. Typically less than half the disc circumference is within the induction field of the coils at any one time. This electric motor 10 can therefore be retrofitted in place of the hydraulic brake calliper on a vehicle using the same mounting lugs and bolts to provide brake and drive torque to each wheel.

A variable alternating current, in this case to a maximum of 336 volts, is provided to the coils in a 3-phase waveform from a DC battery power source 14 by microprocessor controlled IGBT inverters 16. The firmware within the microprocessor controls the switch timing and configuration of the IGBT inverters to convert direct current from the battery source to 3-phase alternating current at variable frequency that is provided to the electromagnetic coils facing the in-wheel brake disc.

Motor speed which is directly proportional to wheel speed is varied by altering the AC waveform frequency. Zero Hz (cycles per second) represents zero motor speed. An increase in frequency will increase motor speed and provide torque for vehicle acceleration in response to throttle pedal inputs. Once at speed, a decrease in frequency will provide regenerative braking torque. The larger the difference between motor speed and inverter frequency, as requested by the brake pedal input, the greater the regenerative brake torque and regenerative current flow back to recharge the battery power source. Increased brake pedal input up to a predetermined point, reduces the frequency to zero Hz, stopping regenerative current and causing the application of DC direct current to stop the motor(s). Further increases in brake pedal input to apply greater braking force to the wheel motor results in the 3 phase AC signal being reversed by swapping 2 phases and increased frequency is applied to provide eddy current braking up to and equal to maximum torque of the motor. Vehicle reverse is also provided by swapping the same two phases to reverse the motors. Anti-Lock brake function is provided by high speed frequency modulation ranging between regenerative frequency, DC and eddy current brake frequency in response to wheel speed sensor input and other parameters. Brake modulation may be adjusted more than 50,000 times per second according to microprocessor frequency.

If each in-wheel motor is provided with a dedicated IGBT inverter, such as shown in FIG. 3, motor torque can be regulated independently for each motor. When each wheel has a wheel speed sensor such as a typical Hall effect sensor commonly used in anti-lock braking systems, this provides a closed loop feedback to facilitate anti-slip traction control for drive and braking applications. With the addition of a multi-axes accelerometer input into the microprocessors, lateral stability control can be implemented in addition to high performance emergency braking algorithms. The addition of a front mounted distance measuring device such as sonar/radar on the vehicle to input into the microprocessors, allows intelligent cruise control to be implemented with fine brake and acceleration control based on the selected proximity required between following vehicles and can be used in combination with the accelerometer for emergency braking and collision avoidance algorithm input. Adding a steering wheel angle input to the microprocessor can provide input into vehicle stability algorithms and provide primary input along with accelerometer input for enhanced cornering performance varying the speed differential between inside and outside wheels while cornering by adjusting applied frequency in either brake or drive modes or regenerative torque to each wheel motor individually.

Second Preferred Embodiment

In this further preferred embodiment, the vehicle drive system again comprises an electric motor for each wheel of the vehicle, a control system and a power source. The DC power supplied by the battery power source is preferably supplied as frequency modulated alternating current to each individual wheel motor via separate IGBT inverters controlled by a microprocessor.

In this embodiment also, the microprocessor is adapted to accept various sensor inputs to monitor wheel rotation, rotation differentials, accelerator and brake pedal status and steering wheel angle. Other inputs may include cruise control settings and collision sensing means.

The electric motor at each wheel may be described as a double sided linear induction motor in which the stator is curved 180 degrees and used to produce electromagnetic induction to a rotor disc in an axial flux direction. In this embodiment, the stator core is laminated and can be made from a toroidal winding of lamination steel cut in half to form two 180 degree arcs. Coil windings are laid in slots provided within the laminated core.

As before, the disc may be the standard cast iron motor vehicle brake disc mounted in the standard position at the wheel hub of each wheel. However, for maximum efficiency, the standard brake disc may be replaced with a disc incorporating a toroidal laminated core with copper or aluminium ladder bars contained radially within to form a squirrel cage.

Figure 4:
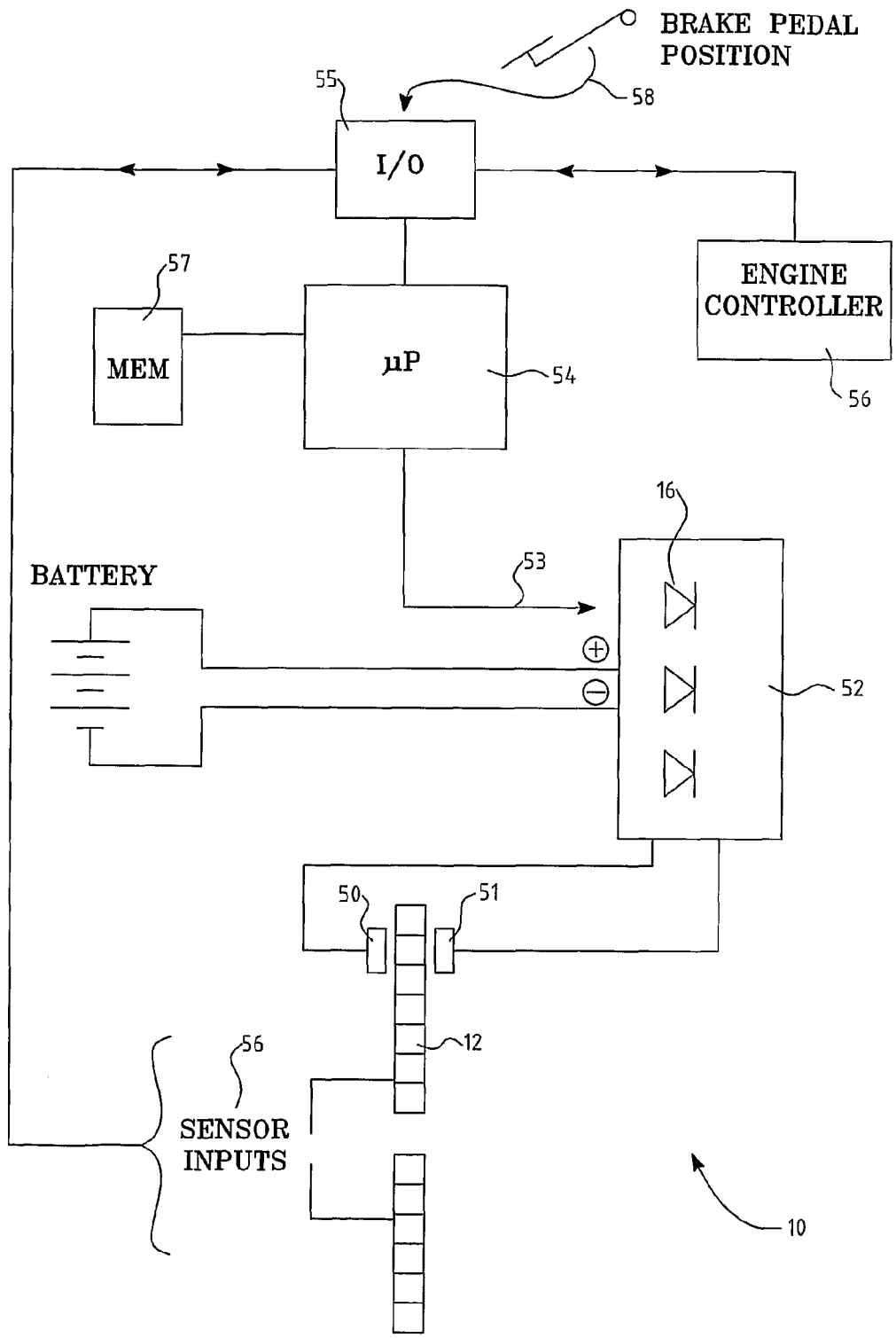
FIG. 4 is an electrical schematic of one possible implementation of the motor drive and brake unit according to an embodiment of the present invention.

With reference to FIG. 4 a basic electrical schematic of the above described arrangement is illustrated. In this instance rotor 12 forms part of a motor 10. More particularly, the disc brake rotor 12 forms the rotor of the motor 10. Coils 50, 51 are placed in opposed relationship to the brake disc 13 as illustrated in cross-section in FIG. 4. Appropriate drive wave forms are applied to the coils 50, 51 from the power electronics unit 52 thereby to induce a torque in the brake disc 12 for the purpose of either a positive drive of the vehicle wheel (not shown) to which the disc brake rotor is attached, or in the alternative, positive braking force to the same wheel. The rotor 12 may take any form as previously described in this specification. Similarly the coils 50, 51 can be disposed as described in respect of any of the previous embodiments.

The power electronics 52 are driven by control signals 53 from micro processor 54. Micro processor 54 derives inputs from I/O unit 55. The control inputs can include sensor inputs 56 from the wheel as previously described and/or can include input from the engine controller 56 (particularly in the case of hybrid systems eg petrol/electric). Again as previously described brake pedal position 58 can also be an input.

Typically a program will reside in memory 57 in order to provide instructions to micro processor 54 in order to effect appropriate control of the power electronics 52.

<center>In Use</center>

It will be appreciated that the system described above provides for a very flexible drive system for a vehicle. The use of individually controlled electric motors at each of the vehicle wheels allows the use of sophisticated electrical input to provide the various functions of driving and braking torque, anti-lock braking, cruise and traction control. An additional feature is that the drive system of the invention can be retro-fitted to the standard suspension of an all disc-brake vehicle chassis.

Although the above described embodiments are directed at suspension and braking systems in which the brake disc is mounted at the wheel hub, it will be understood that the motors and drive system of the present invention may equally be applied to the discs of an inboard disc brake system.

Similarly, whilst the main examples concern an all wheel drive pure battery/electric system, the principles can be applied to hybrid petrol or diesel/electric systems. Furthermore having only some wheels driven is also contemplated. For example in some applications having only the two front or two rear wheels of a car may be sufficient. In the case of a motor cycle either one or both wheels may be driven.

The above describes only some embodiments of the present invention and modifications, obvious to those skilled in the art, can be made thereto without departing from the scope and spirit of the present invention.

What is claimed is:

1. An electric drive system for a vehicle; said vehicle having at least one wheel incorporating a brake disc; said drive system including an electric motor at said at least one wheel of said vehicle; said electric motor adapted to provide rotational torque to the brake disc of said at least one wheel of said vehicle by way of induced eddy current from an electromagnetic field traveling in the same direction and opposite direction to the direction of disc rotation;

wherein said motor comprises pairs of electromagnetic coils, wherein corresponding ones of each of said pairs of coils are disposed on opposite sides of a brake disc of said wheel;

wherein said electromagnetic coils are provided with variable frequency 3-phase alternating current; said alternating current provided via an inverter from a battery power source;

wherein braking of said vehicle is induced when said variable frequency is less than a frequency commensurate with a said rotational velocity;

wherein there are at least two wheels with said disc brake and motor and wherein rotational velocity and direction of each wheel of said vehicle to which said electric motor is fitted is controlled independently of other wheels to which said electric motor is fitted and is a function of said variable frequency and modulation and phases of said 3-phase alternating current;

wherein a first variable braking force is applied to each of said brake discs while said rotational direction is commensurate with said phases but said variable frequency is between that commensurate with said rotational velocity of said wheel and 0 Hz and a second variable braking force is applied to said brake disc when said rotational direction is opposite to that indicated by said arranging of two phases and said variable frequency is greater than 0 Hz;

wherein Direct Current (DC) can be applied to the stator coils with the microprocessor controlled modulation to bring the vehicle to a complete stop, said microprocessor receiving multi-axis accelerometer input;

wherein each motor has microprocessor input which is adapted to apply varying drive and/or brake rotational torque to each wheel independently as a function of inputs from sensors monitoring one or more of rotational velocity of each wheel, said steering angle, throttle or brake pedal position to provide one or more of stability control, traction control, active brake bias control and active wheel speed differential control as determined by frequency modulation patterns stored in microprocessor read only memory; and wherein said microprocessors input is adapted to apply anti-lock braking characteristics to said second variable breaking force when said sensors record disparate rotational velocities.

2. The system of claim 1 wherein there are at least two wheels with said disc brake and motor and each electric motor is individually supplied with said variable frequency 3-phase alternating current by a separate microprocessor controlled inverter.

3. The system of claim 1 wherein said brake disc is a brake disc of an automotive disc brake system; said brake disc mounted at the hub of each wheel of said vehicle.

4. The system of claim 1 wherein said brake disc comprises a toroidal laminated core with copper or aluminum ladder bars contained radially within said disc to form short circuited conducting bars.

5. The system of claim 1 wherein said pairs of coils are connected in series or in parallel; said coils supplied with said 3-phase alternating current on the same phase.

6. The system of claim 1 wherein said pairs of coils comprise three or more pairs of coils; said coils disposed within an arc of said brake disc in a double sided linear induction motor configuration wherein the stators have a beginning and end.

7. The system of claim 1 wherein said motor is adapted to replace a standard hydraulic disc brake calliper.

8. The system of claim 7 wherein said motor is of similar bulk as that of said hydraulic disc brake calliper; said motor adapted for mounting to mounting points of said hydraulic brake disc calliper.

9. The system of claim 1 wherein each motor is individually controlled and the direction of rotation torque of said motor urges said vehicle in a first forward direction when two phases of said 3-phase alternating current are arranged in a first phase configuration.

10. The system of claim 1 wherein said direction of rotation torque of a said motor is reversed when said two phases of said 3-phase alternating current are arranged in a second phase configuration.

11. The system of claim 1 wherein braking of said vehicle is induced when said variable frequency is less than a frequency commensurate with a said rotational velocity.

12. The system of claim 11 wherein said braking is regenerative adapted to recharging said battery power source when the slip angle of a traveling wave in the stator is negative in relation to the disc rotation speed.

13. The system of claim 1 wherein a first variable braking force is applied to a said brake disc while said rotational direction is commensurate with said phases but said variable frequency is between that commensurate with said rotational velocity of said wheel and 0 Hz; the greater the negative slip percentage between the stator traveling wave frequency as controlled by microprocessor input and the disc rotation frequency, the greater the resulting braking torque.

14. The system of claim 13 wherein the system is configured so that Direct Current (DC) can be applied to the stator coils with the microprocessor controlled modulation to bring the vehicle to a complete stop.

15. The system of claim 1 wherein a second variable braking force is applied to said brake disc when said rotational direction is opposite to that indicated by said arrangement of two phases and said variable frequency is greater than 0 Hz thereby reversing stator traveling field direction to disc direction with increased negative frequency resulting in increased braking torque.

16. The system of claim 14 wherein said first variable braking force and said second variable braking force are controlled through a potentiometer connected to a brake pedal of said vehicle.

17. The system of claim 1 wherein said rotational velocity of each of wheel is monitored by sensors or back EMF.

18. An electric drive system for a vehicle; said vehicle having at least one wheel incorporating a brake disc; said drive system including an electric motor at said at least one wheel of said vehicle; said electric motor adapted to provide rotational torque to the brake disc of said at least one wheel of said vehicle by way of induced eddy current from an electromagnetic field traveling in the same direction and opposite direction to the direction of disc rotation;
wherein said motor comprises pairs of electromagnetic coils, wherein corresponding ones of each of said pairs of coils are disposed on opposite sides of a brake disc of said wheel;
wherein said electromagnetic coils are provided with variable frequency 3-phase alternating current; said alternating current provided via an inverter from a battery power source;
wherein a first variable braking force is applied to a said brake disc while said rotational direction is commensurate with said phases but said variable frequency is between that commensurate with said rotational velocity of said wheel and 0 Hz; the greater the negative slip percentage between the stator traveling wave frequency as controlled by microprocessor input and the disc rotation frequency, the greater the resulting braking torque;
wherein Direct Current (DC) can be applied to the stator coils with the microprocessor controlled modulation to bring the vehicle to a complete stop; and
wherein a second variable braking force is applied to said brake disc when said rotational direction is opposite to that indicated by said arrangement of two phases and said variable frequency is greater than 0 Hz thereby reversing stator traveling field direction to disc direction with increased negative frequency resulting in increased braking torque.

* * * * *